(12) United States Patent
Nishida et al.

(10) Patent No.: US 8,002,663 B2
(45) Date of Patent: Aug. 23, 2011

(54) AUTOMATIC TRANSMISSION

(75) Inventors: Masaaki Nishida, Anjo (JP); Hiroshi Katou, Anjo (JP); Masashi Kitou, Anjo (JP); Kohei Iizuka, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 784 days.

(21) Appl. No.: 12/071,565

(22) Filed: Feb. 22, 2008

(65) Prior Publication Data
US 2008/0207384 A1      Aug. 28, 2008

(30) Foreign Application Priority Data

Feb. 23, 2007   (JP) ................................. 2007-043279
Jul. 5, 2007     (JP) ................................. 2007-177827

(51) Int. Cl.
F16H 3/44       (2006.01)
F16D 21/00     (2006.01)

(52) U.S. Cl. ................... 475/284; 192/48.619
(58) Field of Classification Search ............... 475/313, 475/325, 275, 284, 285; 192/48.601–48.619
See application file for complete search history.

(56) References Cited

U.S. PATENT DOCUMENTS

| | | | | |
|---|---|---|---|---|
| 5,230,664 A * | 7/1993 | Michioka et al. | ............ | 474/43 |
| 6,382,382 B1 * | 5/2002 | Avny et al. | ............ | 192/106 F |
| 7,416,069 B2 * | 8/2008 | Tiesler | ............ | 192/48.611 |
| 7,731,623 B2 * | 6/2010 | Nishida et al. | ............ | 475/275 |
| 7,862,461 B2 * | 1/2011 | Nishida et al. | ............ | 475/146 |
| 7,862,465 B2 * | 1/2011 | Nishida et al. | ............ | 475/275 |
| 2003/0232675 A1 | 12/2003 | Miyazaki et al. | | |
| 2007/0060438 A1 | 3/2007 | Fukuyama et al. | | |
| 2007/0184932 A1 | 8/2007 | Tabata et al. | | |
| 2008/0207386 A1 * | 8/2008 | Nishida et al. | ............ | 475/276 |
| 2008/0220928 A1 * | 9/2008 | Nishida et al. | ............ | 475/275 |
| 2009/0017954 A1 * | 1/2009 | Nishida et al. | ............ | 475/159 |
| 2009/0029820 A1 * | 1/2009 | Nishida et al. | ............ | 475/159 |

FOREIGN PATENT DOCUMENTS

| | | |
|---|---|---|
| JP | A 05-118423 | 5/1993 |
| JP | A-07-269665 | 10/1995 |
| JP | A 2004-19830 | 1/2004 |
| JP | A-2006-342845 | 12/2006 |
| JP | A-2007-032624 | 2/2007 |
| WO | WO 2005/026579 A1 | 3/2005 |

* cited by examiner

Primary Examiner — Roger Pang
(74) Attorney, Agent, or Firm — Oliff & Berridge, PLC

(57) ABSTRACT

An automatic transmission that includes two adjacent clutches. Two clutches each include a clutch drum, a piston that structures an operating oil chamber with a portion of the clutch drum used as a cylinder, a plurality of friction plates that engage with the clutch drum, a cancel oil chamber that is arranged on a back surface side of the piston and that cancels a centrifugal oil pressure acting on the operating oil chamber, and a return spring that is provided within the cancel oil chamber and that is structured between a cancel plate and a back surface of the piston and that biases the piston toward the operating oil chamber.

7 Claims, 4 Drawing Sheets

FIG.2

|      | C1 | C2 | C3 | C4 | B1 | B2  | F1 |
|------|----|----|----|----|----|-----|----|
| 1st  | ●  |    |    |    |    | (●) | ●  |
| 2nd  | ●  |    |    |    | ●  |     |    |
| 3rd  | ●  |    | ●  |    |    |     |    |
| 4th  | ●  |    |    | ●  |    |     |    |
| 5th  | ●  | ●  |    |    |    |     |    |
| 6th  |    | ●  |    | ●  |    |     |    |
| 7th  |    | ●  | ●  |    |    |     |    |
| 8th  |    | ●  |    |    | ●  |     |    |
| Rev1 |    |    | ●  |    |    | ●   |    |
| Rev2 |    |    |    | ●  |    | ●   |    |

(●) DENOTES BEING CARRIED OUT DURING ENGINE BRAKING

AUTOMATIC TRANSMISSION

INCORPORATION BY REFERENCE

The disclosure of Japanese Patent Application No. 2007-177827 filed on Jul. 5, 2007, and Japanese Patent Application No. 2007-043279 filed on Feb. 23, 2007, including the specifications, drawings and abstracts are incorporated herein by reference in their entirety.

BACKGROUND

The present invention relates to an automatic transmission.

In recent years, automatic transmissions mounted in vehicles have been designed with more speeds, such as eight forward speeds, for example. The automatic transmission must also achieve a compact arrangement for many components, such as clutches, from the standpoint of vehicle mountability.

There exists an automatic transmission (see, for example, Japanese Patent Application Publication No. JP-A-2006-342845) where two clutches have an input member in common and another input member that is not. The one clutch among the two clutches is positioned on an outer diameter side and fitted inside a clutch drum of the other clutch among the two clutches, which is positioned on an inner diameter side. The two clutches are aligned and arranged in an axial direction, thereby achieving compactness in the axial direction. The two clutches respectively include friction plates formed from multiple discs, an operating oil chamber that operates the friction plates, and a cancel oil chamber that cancels out a centrifugal oil pressure of a the operating oil chamber.

Among the two cancel oil chambers, the cancel oil chamber of the other clutch positioned on the inner diameter side is formed by a piston, a return spring, and a cancel plate on a rear surface side of the operating oil chamber. The cancel plate of the other clutch is retained by a snap ring on a boss portion of the one clutch.

In addition, an operating oil chamber and a cancel oil chamber of the one clutch positioned on the outer diameter side are structured rearward of the other clutch. The cancel oil chamber of the one clutch is also structured by a piston, a return spring, and a cancel plate. The cancel plate of the one clutch is retained by a snap ring and disposed on a clutch drum of the one clutch.

SUMMARY

For the above two clutches, the cancel plates structuring the cancel oil chambers are retained by the respective snap rings. As a consequence, there is an increased number of components, and an increased dimension in the axial direction due to the snap rings.

Hence, the present invention provides an automatic transmission that resolves the above problems with a compact structure that is particularly compact in an axial direction due to the elimination of a snap ring. The present invention can also achieve various other advantages.

According to an exemplary aspect of the invention, an automatic transmission includes two adjacent clutches. Two clutches each include a clutch drum, a piston that structures an operating oil chamber with a portion of the clutch drum used as a cylinder, a plurality of friction plates that engage with the clutch drum, a cancel oil chamber that is arranged on a back surface side of the piston and that cancels a centrifugal oil pressure acting on the operating oil chamber, and a return spring that is provided within the cancel oil chamber and that is structured between a cancel plate and a back surface of the piston and that biases the piston toward the operating oil chamber. The cancel plate of one clutch among the two clutches and the piston of the other clutch among the two clutches are arranged so as to oppose an energizing force of the return spring of the two clutches. The cancel plate of the other clutch among the two clutches is disposed retained by a holding member with respect to the one clutch among the two clutches. The return spring of the one clutch among the two clutches has an energizing force that is stronger than that of the return spring of the other clutch among the two clutches.

BRIEF DESCRIPTION OF THE DRAWINGS

Various exemplary aspects of the invention will be described with reference to the drawings, wherein:

FIG. 2 is an engagement chart of the automatic transmission according to the present invention;

DETAILED DESCRIPTION OF EMBODIMENTS

Embodiments of the present invention will be described below with reference to the drawings.

An automatic transmission according to the present invention is an automatic transmission suitable for mounting in a front engine/front wheel drive (FF) or other type of vehicle. Note that the right and left directions in FIGS. 1, 3, and 4 correspond to forward and rearward directions of the automatic transmission when actually mounted in a vehicle correspond to forward and rearward directions of a power transfer path (a driving source side and a wheel side are referred to as a front side and a rear side, respectively). To facilitate descriptions, however, the right side in the figures, i.e., a driving source side of an engine or the like, indicates a forward side, while the left side in the figures indicates a rearward side.

Figure 1:
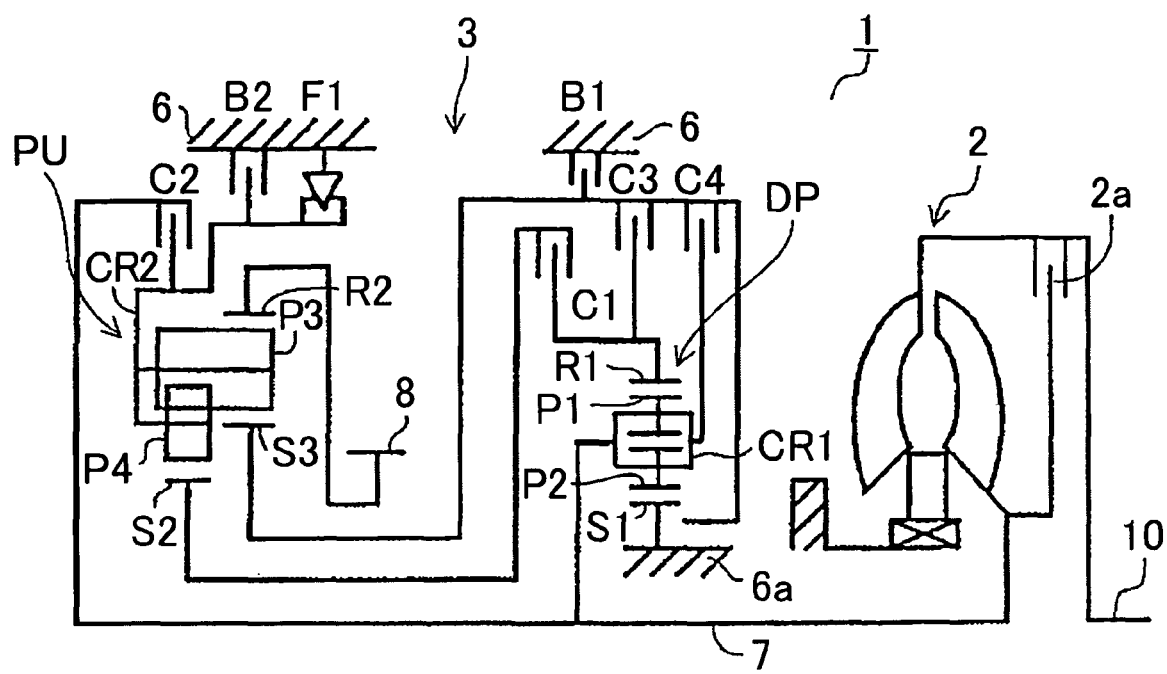
FIG. 1 is a skeleton diagram schematically showing an automatic transmission according to the present invention.
Figure 1:
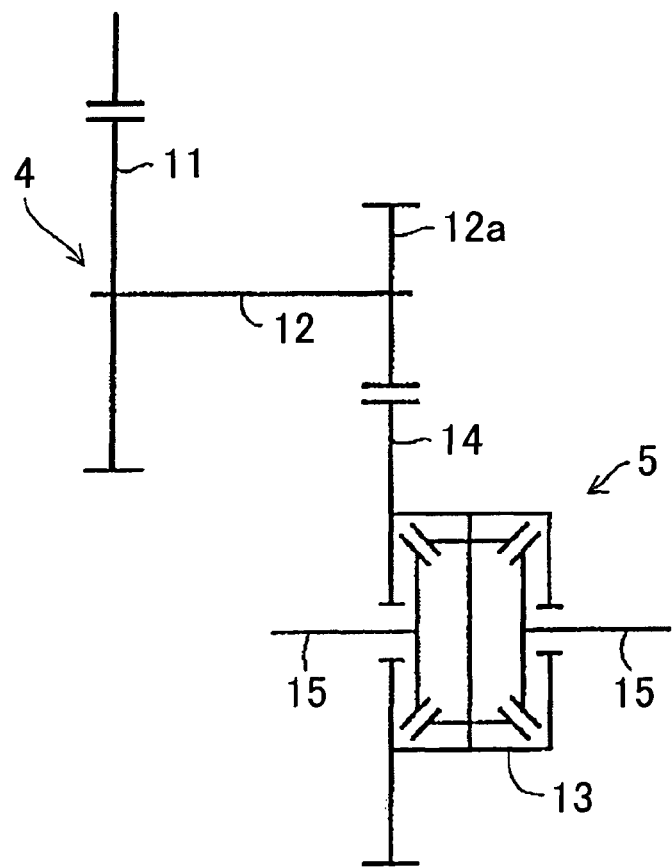

First, a schematic structure of an automatic transmission 1 to which the present invention may be adapted will be described with reference to FIG. 1. As shown in FIG. 1, the FF type automatic transmission 1 is provided with a case 6 such as a housing case and a transmission case that is formed from a housing case and a transmission case. A forward side of the case (specifically, the converter housing) 6 includes an input member (a front cover and a center piece) 10 that can be linked to an engine (not shown). Furthermore, a torque converter 2 having a lock-up clutch 2a is disposed in the automatic transmission 1, and a speed change mechanism 3, a counter shaft portion 4, and a differential portion 5 are arranged within a transmission case.

The torque converter 2 is arranged on an axis that is centered on an input shaft 7 of the speed change mechanism 3, wherein the input shaft 7 is on the same axis as an output shaft of the engine (not shown). In addition, the counter shaft portion 4 is arranged on a counter shaft 12 that is on an axis parallel with the input shaft 7, while the differential portion 5 is arranged so as to have a right and left axles 15 on an axis parallel with the counter shaft 12.

The speed change mechanism 3 is provided with a planetary gear (a reduction planetary gear) DP on the input shaft 7. A planetary gear unit (a planetary gear set) PU is provided on a rearward side of the speed change mechanism 3.

As shown in FIG. 1, the planetary gear DP is a so-called double pinion planetary gear, which is provided with a first sun gear S1, a first carrier CR1, and a first ring gear R1, wherein the first carrier CR1 meshes with both a pinion P2 that meshes with the first sun gear S1 and a pinion P1 that meshes with the first ring gear R1.

Meanwhile, the planetary gear unit PU is a so-called Ravigneaux type planetary gear with four rotational elements: a second sun gear S2, a third sun gear S3, a second carrier CR2, and a second ring gear R2, wherein the second carrier CR2 meshes with both a long pinion P3 that meshes with the third sun gear S3 and the second ring gear R2, and a short pinion P4 that meshes with the second sun gear S2.

In the planetary gear DP, the first sun gear S1 is held stationary with respect to the case 6. The carrier CR1 is connected with the input shaft 7, and the rotation of the carrier CR1 (referred to as "input rotation" below) is identical to the rotation of the input shaft 7. The carrier CR1 is also connected with a fourth clutch C4. Due to the stationary first sun gear S1 and the input rotation of the first carrier CR1, the input rotation of the first ring gear R1 is a decelerated rotation that has been reduced in speed. Also, the first ring gear R1 is connected with a first clutch C1 and a third clutch C3.

In the planetary gear unit PU, the third sun gear S3 is connected with a first brake B1 and fixable with respect to the case 6. The third sun gear S3 is also connected with the fourth clutch C4 and the third clutch C3. Both the input rotation of the first carrier CR1 and the decelerated rotation of the first ring gear R1 can be input to the third sun gear S3 via the fourth clutch C4 and the third clutch C3, respectively. The second sun gear S2 is connected with the first clutch C1, and the decelerated rotation of the first ring gear R1 can be input thereto.

Furthermore, the second carrier CR2 is connected with a second clutch C2 to which the rotation of the input shaft 7 is input, and such input rotation can be input to the second carrier CR2 via the second clutch C2. The second carrier CR2 is also connected with a one-way clutch F1 and a second brake B2. The one-way clutch F1 regulates the rotation of the second carrier CR2 in one direction with respect to the case (specifically, the transmission case) 6, while the second brake B2 is capable of stopping the rotation of the second carrier CR2. The second ring gear R2 is connected with a counter gear 8, which is rotatably supported with respect to a center support member that is fixed by the transmission case 6B.

The counter gear 8 meshes with a large diameter gear 11 that is fixed on the counter shaft 12 of the counter shaft portion 4. The counter shaft 12 meshes with a gear 14 of the differential portion 5 via a small diameter gear 12a formed on an outer peripheral surface thereof. The gear 14 is fixed to a differential gear 13, and is connected with right and left axles 15, 15 via the differential gear 13.

Based on the above structure, the operation of the speed change mechanism 3 will be explained next with reference to FIGS. 1 and 2.

For a D (drive) range, for example, in a first forward speed (1st), the first clutch C1 and the one-way clutch F1 are engaged, as shown in FIG. 2. Accordingly, the rotation of the first ring gear R1, which has been reduced in speed by the stationary first sun gear S1 and the input rotation of the first carrier CR1, is input to the second sun gear S2 via the first clutch C1. The rotation of the second carrier CR2 is regulated in one direction (a normal rotation direction), i.e., the second carrier CR2 is stationary and reverse rotation thereof is prevented. Accordingly, the decelerated rotation input to the second sun gear S2 is output to the second ring gear R2 via the stationary second carrier CR2, and a normal rotation serving as the first forward speed is output from the counter gear 8.

Note that during engine brake use (during coasting), the second brake B2 is locked to hold the second carrier CR2 stationary and prevent the normal rotation of the second carrier CR2, thus maintaining the first forward speed state. In the first forward speed, the one-way clutch F1 prevents the reverse rotation of the second carrier CR2 while enabling normal rotation. Therefore, when shifting from a non-driving range to a driving range, for example, the first forward speed can be smoothly achieved through automatic engagement of the one-way clutch F1.

In a second forward speed (2nd), the first clutch C1 is engaged and the first brake B1 is locked. Accordingly, the rotation of the first ring gear R1, which has been reduced in speed by the stationary first sun gear S1 and the input rotation of the first carrier CR1, is input to the second sun gear S2 via the first clutch C1. The third sun gear S3 is held stationary due to locking of the first brake B1. Accordingly, the decelerated rotation of the second carrier CR2 is slower than that of the second sun gear S2. The decelerated rotation input to the second sun gear S2 is output to the second ring gear R2 via the second carrier CR2, and a normal rotation serving as the second forward speed is output from the counter gear 8.

In a third forward speed (3rd), the first clutch C1 and the third clutch C3 are engaged. Accordingly, the rotation of the first ring gear R1, which has been reduced in speed by the stationary first sun gear S1 and the input rotation of the first carrier CR1, is input to the second sun gear S2 via the first clutch C1. The decelerated rotation of the first ring gear R1 is input to the third sun gear S3 due to engagement of the third clutch C3. In other words, since the decelerated rotation of the first ring gear R1 is input to the third sun gear S3 and the second sun gear S2, the decelerated rotation of the planetary gear unit PU is transferred in a direct coupling. The decelerated rotation is thus output unchanged to the second ring gear R2, and a normal rotation serving as the third forward speed is output from the counter gear 8.

In a fourth forward speed (4th), the first clutch C1 and the fourth clutch C4 are engaged. Accordingly, the rotation of the first ring gear R1, which has been reduced in speed by the stationary first sun gear S1 and the input rotation of the first carrier CR1, is input to the second sun gear S2 via the first clutch C1. The input rotation of the first carrier CR1 is input to the third sun gear S3 due to engagement of the fourth clutch C4. Accordingly, the decelerated rotation of the second carrier CR2 is faster than that of the second sun gear S2. The decelerated rotation input to the second sun gear S2 is output to the second ring gear R2 via the second carrier CR2, and a normal rotation serving as the fourth forward speed is output from the counter gear 8.

In a fifth forward speed (5th), the first clutch C1 and the second clutch C2 are engaged. Accordingly, the rotation of the first ring gear R1, which has been reduced in speed by the stationary first sun gear S1 and the input rotation of the first carrier CR1, is input to the second sun gear S2 via the first clutch C1. The input rotation is also input to the second carrier CR2 due to engagement of the second clutch C2. Accordingly, due to the decelerated rotation input to the second sun gear S2 and the input rotation input to the second carrier CR2, a decelerated rotation faster than the fourth forward speed is achieved and output to the second ring gear R2, and a normal rotation serving as the fifth forward speed is output from the counter gear 8.

In a sixth forward speed (6th), the second clutch C2 and the fourth clutch C4 are engaged. Accordingly, the input rotation of the first carrier CR1 is input to the third sun gear S3 due to engagement of the fourth clutch C4. The input rotation is also input to the second carrier CR2 due to engagement of the second clutch C2. In other words, since the input rotation is input to the third sun gear S3 and the second carrier CR2, the input rotation of the planetary gear unit PU is transferred in a direct coupling. The input rotation is thus output unchanged to the second ring gear R2, and a normal rotation serving as the sixth forward speed is output from the counter gear 8.

In a seventh forward speed (7th), the second clutch C2 and the third clutch C3 are engaged. Accordingly, the rotation of the first ring gear R1, which has been reduced in speed by the stationary first sun gear S1 and the input rotation of the first carrier CR1, is input to the third sun gear S3 via the third clutch C3. The input rotation is also input to the second carrier CR2 due to engagement of the second clutch C2. Accordingly, due to the decelerated rotation input to the third sun gear S3 and the input rotation input to the second carrier CR2, a decelerated rotation slightly faster than the input rotation is achieved and output to the second ring gear R2, and a normal rotation serving as the seventh forward speed is output from the counter gear 8.

In an eighth forward speed (8th), the second clutch C2 is engaged and the first brake B1 is locked. Accordingly, the input rotation is input to the second carrier CR2 due to engagement of the second clutch C2. The third sun gear S3 is held stationary due to locking of the first brake B1. Accordingly, due to the stationary third sun gear S3, the input rotation of the second carrier CR2 becomes faster than the seventh forward speed and output to the second ring gear R2, and a normal rotation serving as the eighth forward speed is output from the counter gear 8.

In a first reverse speed (Rev1), the third clutch C3 is engaged and the second brake B2 is locked. Accordingly, the rotation of the first ring gear R1, which has been reduced in speed by the stationary first sun gear S1 and the input rotation of the first carrier CR1, is input to the third sun gear S3 via the third clutch C3. The second carrier CR2 is held stationary due to locking of the second brake B2. Accordingly, the decelerated rotation input to the third sun gear S3 is output to the second ring gear R2 via the stationary second carrier CR2, and a reverse rotation serving as the first reverse speed is output from the counter gear 8.

In a second reverse speed (Rev2), the fourth clutch C4 is engaged and the second brake B2 is locked. Accordingly, the input rotation of the first carrier CR1 is input to the third sun gear S3 due to engagement of the fourth clutch C4. The second carrier CR2 is held stationary due to locking of the second brake B2. Accordingly, the input rotation input to the third sun gear S3 is output to the second ring gear R2 via the stationary second carrier CR2, and a reverse rotation serving as the second reverse speed is output from the counter gear 8.

Note that in a P (parking) range and an N (neutral) range, for example, the first clutch C1, the second clutch C2, the third clutch C3, and the fourth clutch C4 are released. Accordingly, the first carrier CR1 and the third sun gear S3 are disconnected, and the first ring gear R1, the third sun gear S3, and the second sun gear S2 are disconnected from each other as well. In other words, the planetary gear DP and the planetary gear unit PU are disconnected. The input shaft 7 and the second carrier CR2 are also disconnected. Thus, the power transfer between the input shaft 7 and the planetary gear unit PU is disconnected, i.e., the power transfer from the input shaft 7 to the counter gear 8 is disconnected.

Figure 3:
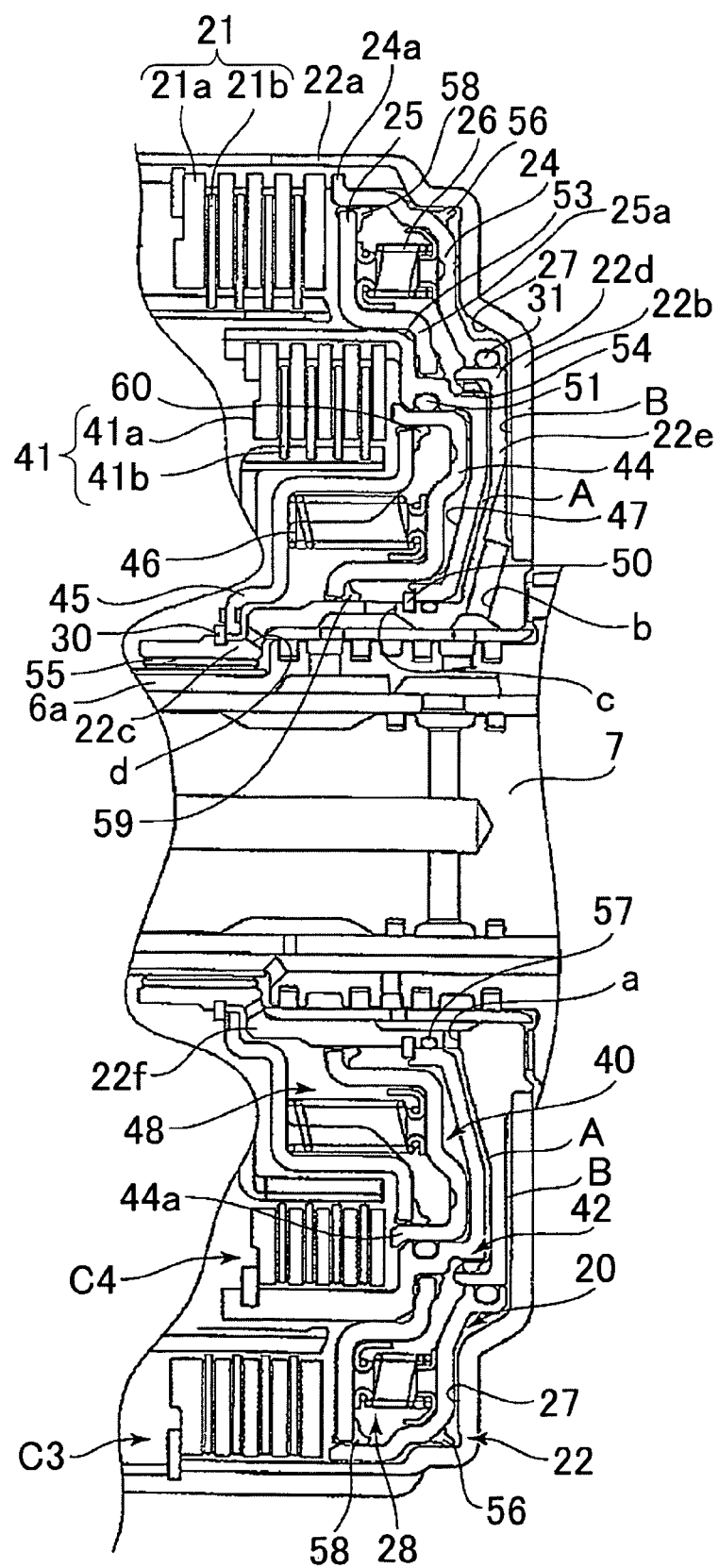
FIG. 3 is an enlarged cross-sectional view showing part of an automatic transmission according to a first embodiment of the present invention.

Next, the structure of the third (the one) clutch C3 and the fourth (the other) clutch C4 according to the first embodiment of the present invention will be described based on a speed change mechanism and with reference to FIG. 3. The fourth clutch C4 is positioned on an inner diameter side, and the third clutch C3 is positioned on an outer diameter side; both are arranged overlapping each other in the axial direction. The outer-diameter-side third clutch C3 and the inner-diameter-side fourth clutch C4 are arranged at different positions in the radial direction so as to enclose the fourth clutch C4.

The hydraulic servo 20 of the third clutch C3 has a clutch drum 22, a piston 24, a cancel plate 25, and a return spring 26. These in turn structure an operating oil chamber 27, and structure the cancel oil chamber 28 on a back surface thereof. The clutch drum 22 is integratedly formed by welding or otherwise combining an inner peripheral side member structuring a boss portion 22c and a piston support portion 22e, and an outer peripheral side member structuring a drum portion 22a and a bottom portion 22b. The drum portion 22a extends rearward of the first clutch C1 (not shown) on an outer peripheral side thereof. The boss portion 22c is rotatably supported on a stator shaft (a fixed member) 6a via a bushing 55. In addition, the boss portion 22c and the drum portion 22a are connected by the bottom portion 22b. Note that the converter housing and the transmission case are integrally connected and designated as the case 6. In addition, the case and the members integrated with the case are fixed members, which include the case, an oil pump cover and its case, the stator shaft 6a and the like. Therefore, the first sun gear S1 and the boss portion 22c of the clutch drum 22 may be fixed and rotatably supported by any fixed members such as the case or the fixed members integrated with the case as well as the stator shaft 6a, respectively.

An intermediate portion of the bottom portion 22b of the clutch drum 22 is formed with a collar portion 22d on an outer periphery of the piston support portion 22e, which extends from the boss portion 22c to the outer diameter side. The collar portion 22d extends a considerably shorter distance than the drum portion 22a and the boss portion 22c and in the same direction as the drum portion 22a and the boss portion 22c. In addition, the collar portion 22d is connected with the piston 24 in an oil tight condition via an O-ring 31 on an outer peripheral surface thereof. The collar portion 22d is also in a spline engagement 54 with the clutch drum 42 of the fourth clutch C4 (described later) on an inner peripheral surface thereof.

The piston 24 is fitted with the collar portion 22d and movable in the axial direction. An outer peripheral surface of the piston 24 is connected with an inner peripheral surface of the clutch drum 22 in an oil tight condition via a seal member 56. The piston member 24 and the inner peripheral surface of the clutch drum 22, which forms a cylinder, both structure the operating oil chamber 27. In addition, the piston 24 is provided with an extension portion 24a that extends rearward, and pressing of the extension portion 24a against the friction plate 21 engages and disengages the third clutch C3.

Meanwhile, the clutch drum 42 of the fourth clutch C4 is provided in an oil tight condition on the boss portion 22c of the third clutch C3 via an O-ring 57, and an axial position thereof is constrained by a snap ring 50. The clutch drum 42 also includes a stepped portion 53, which has a stepped configuration, rearward of the spline engagement 54 with the collar portion 22d of the third clutch C3.

The cancel plate 25 of the third clutch C3 is formed with a stepped portion 25a at an intermediate portion thereof. The stepped portion 25a abuts against the stepped portion 53 that is provided on the clutch drum 42 of the fourth clutch C4 so as to be restricted to the rearward movement in the axial direction, and is held with respect to a direction of oil pressure application of the cancel oil chamber 28. An outer periphery of the cancel plate 25 is fitted with the piston 24 in an oil tight condition via a seal member 58, and an inner periphery of the cancel plate 25 is fitted with the clutch drum 42 in an oil tight condition via a seal member as well. An outer peripheral surface of the cancel plate 25 and an inner peripheral surface of the piston 24 structure the cancel oil chamber 28, which generates an oil pressure that balances the centrifugal oil pressure generated in the operating oil chamber 27 of the third clutch C3. The return spring 26 is provided between the cancel plate 25 and the piston 24, and constantly biases the piston 24 forward. It should be noted that the return spring 26 is a spring having a stronger energizing force than a return spring 46 provided on the cancel oil chamber 48 of the fourth clutch C4 (described later).

The operating oil chamber 27 of the third clutch C3 is supplied with oil from an oil hole b via a predetermined clearance B, which is provided between the piston support portion 22e of the clutch drum 22 and the bottom portion 22b of the clutch drum 22. The clearance B is provided widening in a planar configuration over an entire periphery thereof. Therefore, the clearance B has a larger through-oil cross-sectional area in a space that is shorter (more narrow) in the axial direction, compared with an oil through hole.

The cancel oil chamber 28 of the third clutch C3 is supplied with lubrication oil from an oil hole a via a clearance A, which is provided between the clutch drum 42 of the fourth clutch C4 and the piston support portion 22e back surface of the third clutch C3. The clearance A is provided widening in a planar configuration over an entire periphery thereof. Therefore, the clearance A has a larger through-oil cross-sectional area in a space that is shorter in the axial direction, compared with an oil through hole. It should be noted that the spline engagement 54 provided between the clutch drum 42 of the fourth clutch C4 and the collar portion 22d of the third clutch C3 is missing a tooth and is structured so as not to interrupt the flow of oil in the above-described oil passage.

The hydraulic servo 40 of the fourth clutch C4 has the above-mentioned clutch drum 42, a piston 44, a cancel plate 45, and the return spring 46. These in turn structure an operating oil chamber 47, and structure the cancel oil chamber 48 on a back surface thereof.

The piston 44 is provided movable in the axial direction and in an oil tight condition via the boss portion 22c of the clutch drum 22 of the third clutch C3 and a seal member 59. In addition, the piston 44 is provided with an extension portion 44a that presses against the friction plate 41. An outer peripheral surface of the extension portion 44a and an inner peripheral surface of the clutch drum 42 are fitted in an oil tight condition via an O-ring 51.

The operating oil chamber 47 of the fourth clutch C4 is structured by an outer peripheral surface of the piston 44 and the inner peripheral surface of the clutch drum 42, which forms a cylinder. The operating oil chamber 47 has a structure in which oil is supplied through an oil hole c.

The cancel plate 45 of the fourth clutch C4 is provided with an axial position thereof constrained by a snap ring 30 (which is an example of a holding member) and a stepped portion 22f of the boss portion 22c of the third clutch drum 22. The cancel plate 45 is fitted with the inner peripheral surface of the piston 44 in an oil tight condition via a seal member 60.

The cancel oil chamber 48 generates an oil pressure that balances the centrifugal oil pressure generated by the operating oil chamber 47 of the fourth clutch C4, and is structured by the inner peripheral surface of the piston 44 and an outer peripheral surface of the cancel plate 45. The return spring 46 is provided between the cancel plate 45 and the piston 44, and constantly biases the piston 44 forward. The cancel oil chamber 48 is supplied with lubrication oil by an oil hole d.

Next, the operation of the third clutch C3 and the fourth clutch C4 according to the first embodiment will be explained below.

The third clutch C3 moves the piston 24 in the axial direction by the oil pressure generated in the operating oil chamber 27, and pressing against the friction plate 21 engages and disengages the third clutch C3. The operating oil chamber 27 is supplied with operating oil based on an oil pressure generated by an oil pump (not shown); the operating oil passes from the oil hole b formed in the clutch drum 22 and through the clearance B provided in a planar configuration over an entire periphery thereof before being supplied to the operating oil chamber 27.

Centrifugal oil pressure acts on the operating oil chamber 27. Therefore, the cancel oil chamber 28, which sandwiches the piston 24 and faces the operating oil chamber 27, is supplied with lubrication oil from the oil hole a via the clearance A provided in a planar configuration over an entire periphery thereof. Centrifugal oil pressure is consequently generated in the cancel oil chamber 28, and balances the centrifugal oil pressure generated in the operating oil chamber 27.

Similarly with the fourth clutch C4, the operating oil chamber 47 is supplied with operating oil from the oil hole c based on the oil pump (not shown). The fourth clutch C4 thus moves the piston 44 in the axial direction, and pressing against the friction plate 41 engages and disengages the fourth clutch C4. In addition, the cancel oil chamber 48 is supplied with lubrication oil from the oil hole d. Centrifugal oil pressure is consequently generated in the cancel oil chamber 48, and balances the centrifugal oil pressure generated in the operating oil chamber 47.

Thus, upon disconnection of the third clutch C3, the pressure oil in the operating oil chamber 27 is drained via the clearance B and the oil hole b. However, due to the rotation of the clutch drum 22, centrifugal oil pressure is generated in the operating oil chamber 27. At such time, the back surface of the piston 24 is subjected to the energizing force of the return spring 26 and the centrifugal oil pressure acting on the oil in the cancel oil chamber 28. The piston 24 is thus rapidly moved in a retreating direction against the centrifugal oil pressure in the operating oil chamber 27, and this is accompanied by an increase in the capacity of the cancel oil chamber 28. Oil passes through the clearance A of both the clutch drums 22, 42 for quick replenishment so that no operation delay of the third clutch C3 occurs.

There are cases where a force acts to bring the clutch drum 42 of the fourth clutch C4 closer to the clutch drum 22 of the third clutch C3, such as when the third and fourth clutches C3, C4 are disengaged at the same time and no axial force acts in a direction opposing the clutch drum 22 of the third clutch C3 and the clutch drum 42 of the fourth clutch C4, or when the piston 44 of the fourth clutch C4 performs a stroke in order to engage the fourth clutch C4. Regardless of whether such cases occur, an attachment load of the return spring 26 of the third clutch C3 (a load when the piston 24 is not operating and the return spring 26 is not compressed) is set larger than an operating load of the return spring 46 of the fourth clutch C4 (a load when the piston 44 is operating and the return spring 46 is compressed). Therefore, the energizing force of the return spring 26 acts on the clutch drum 42 via the stepped portion 25a of the cancel plate 25 and the stepped portion 53. As a consequence, both the clutch drums 22, 42 are constantly subjected to an axial force in a separating direction and positioned by the snap ring 50, and an appropriate clearance A is constantly maintained.

As explained above, according to the automatic transmission 1 of the present invention, the third clutch C3 is on an outer diameter side of the fourth clutch C4 overlapping in the axial direction, but arranged at a different position in the radial direction. Thus, it is possible to structure a clutch unit and the automatic transmission compact in the axial direction.

In addition, the return spring 26 provided on the cancel oil chamber 28 of the third clutch C3 is a spring having a stronger energizing force than the return spring 46 provided on the cancel oil chamber 48 of the fourth clutch C4. Thus, both the clutch drums 22, 42 are biased toward a predetermined position set by the snap ring 50, and the clearance A is constantly maintained to a predetermined distance.

Figure 4:
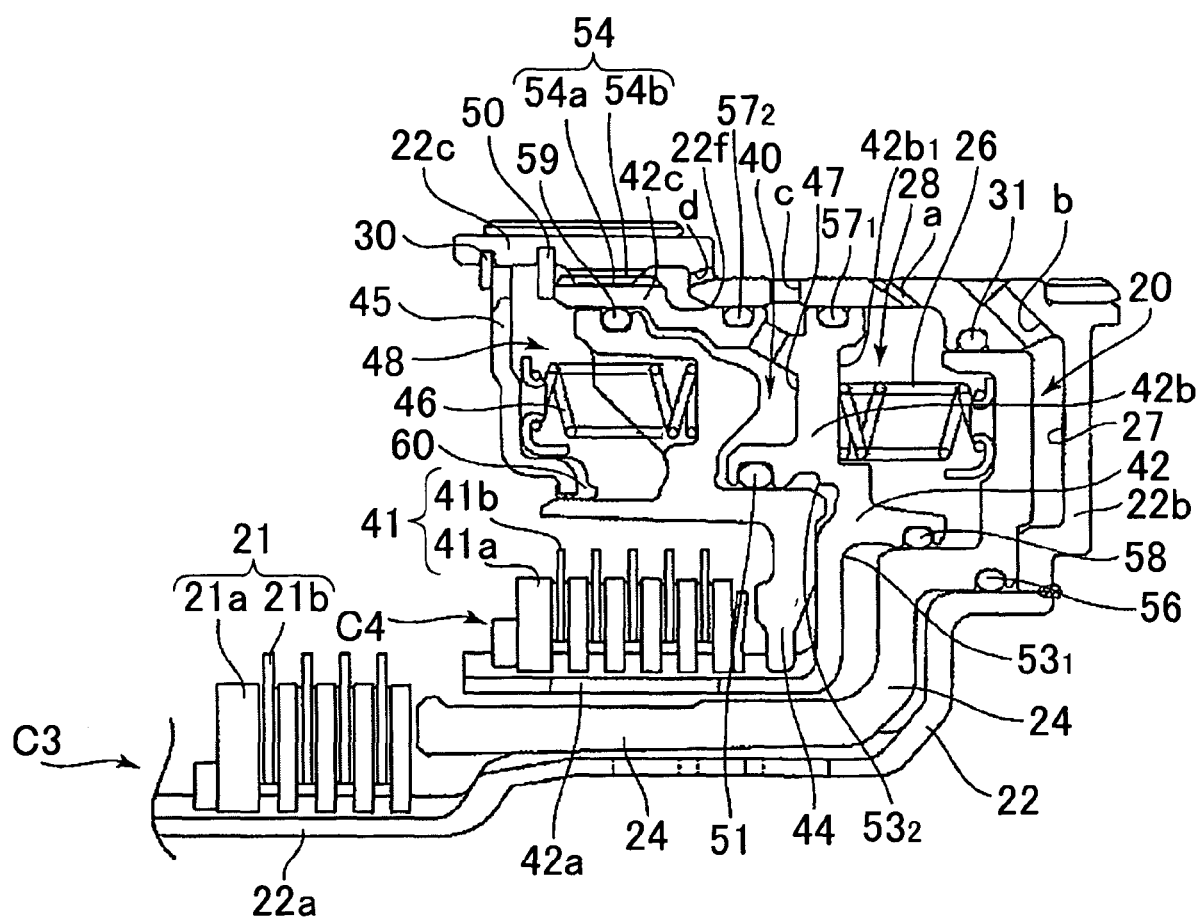
FIG. 4 is an enlarged cross-sectional view showing part of an automatic transmission according to a second embodiment of the present invention.

Next, a second embodiment will be described based on FIG. 4, wherein the third clutch C3 and the fourth clutch C4 are arranged parallel in the axial direction at different positions in the radial direction. Note that in FIG. 4, an upper side with respect to an axial center has the same structure as a lower side and is thus omitted. Also note that members in FIG. 4 corresponding to those of the third and fourth clutches C3, C4 in FIG. 3 use the same references numerals as those in FIG. 3.

The fourth clutch C4 positioned on the inner diameter side and the third clutch C3 positioned on the outer diameter side are arranged adjacent to each other at different positions in the axial direction. An outer peripheral surface 42b1 of a flange portion 42b on a clutch drum 42 of the inner-diameter-side fourth clutch C4 is also used as a cancel plate that structures a cancel oil chamber 28 of the third clutch C3.

The hydraulic servo 20 of the third clutch C3 has a clutch drum 22, a piston 24, the flange portion 42b of the clutch drum 42 of the fourth clutch C4 acting as a cancel plate, and a return spring 26. These in turn structure an operating oil chamber 27, and structure the cancel oil chamber 28 on a back surface thereof. The clutch drum 22 is integratedly formed by welding or otherwise combining an inner peripheral side member forming a boss portion 22c and a bottom portion 22b, and an outer peripheral side member structuring a drum portion 22a. The boss portion 22c is formed with an outer spline 54a, which engages with an inner spline 54b formed on a boss portion 42c of the clutch drum 42 of the fourth clutch C4 (described later). Due to a spline engagement 54, the clutch drum 22 of the third clutch C3 and the clutch drum 42 of the fourth clutch C4 are integratedly structured in a rotational direction.

An inner diameter side of the piston 24 is structured movable in the axial direction and in an oil tight condition via an O-ring 31 on the boss portion 22c of the third clutch C3, and an outer peripheral surface of the piston 24 is fitted in an oil tight condition with an inner peripheral surface of the clutch drum 22 of the third clutch C3 via a seal member 56. The operating oil chamber 27 is formed from an outer peripheral surface of the piston 24 and the inner peripheral surface of the clutch drum 22 of the third clutch C3. The operating oil chamber 27 is directly supplied with oil from an oil hole b provided in the boss portion 22c of the clutch drum 22.

Meanwhile, the clutch drum 42 of the fourth clutch C4 is formed with the cylindrical boss portion 42c on an inner diameter side thereof, the flange portion 42b extending from the boss portion 42c to the outer diameter side, and a drum portion 42a in spline engagement with the outer friction plate 41a. Movement of the clutch drum 42 in the axial direction is constrained by a snap ring 50 formed on the boss portion 42c of the third clutch C3. Also, the drum portion 42a is formed with two L-shaped stepped portions 531, 532 on the outer diameter side of the flange portion 42b. The inner stepped portion 532 positioned on the inner diameter side of the drum portion 42a is formed facing a body rearward direction, and the outer stepped portion 531 positioned on the outer diameter side is formed facing a body forward direction.

In the clutch drum 42 of the fourth clutch C4, the boss portion 42c is fitted in an oil tight condition with the boss portion 22c of the third clutch C3 via O-rings 571, 572, and the outer stepped portion 531 is fitted in an oil tight condition with the inner peripheral surface of the piston 24 of the third clutch C3 on an outer periphery thereof via a seal member 58.

The cancel oil chamber 28 of the third clutch C3 is formed from the outer peripheral surface 42b1 of the flange portion 42b of the fourth clutch C4 and the inner peripheral surface of the piston 24 of the third clutch C3. The cancel oil chamber 28 is supplied with lubrication oil from an oil hole a formed in the boss portion 22c of the third clutch C3. The return spring 26 is provided between the outer peripheral surface 42b1 of the flange portion 42b of the fourth clutch C4 and the inner peripheral surface of the piston 24 of the third clutch C3. The return spring 26 is a spring having a stronger energizing force than a return spring 46 provided on the fourth clutch C4 (described later). Therefore, the clutch drum 42 of the fourth clutch C4 is constantly biased rearward and positioned in contact with the snap ring 50.

The hydraulic servo 40 of the fourth clutch C4 has the clutch drum 42, a piston 44, a cancel plate 45, and the return spring 46. These in turn structure an operating oil chamber 47, and structure the cancel oil chamber 48 on a back surface thereof.

The piston 44 is provided movable in the axial direction and in an oil tight condition on the boss portion 42c of the clutch drum 42 via a seal member 59. The piston 44 is also fitted with the inner stepped portion 532 formed on the clutch drum 42 of the fourth clutch C4 and engaged in an oil tight condition on an outer peripheral surface thereof via an O-ring 51. The operating oil chamber 47 of the fourth clutch C4 is structured by an outer peripheral surface of the piston 44 and an inner peripheral surface of the clutch drum 42, which forms a cylinder. The operating oil chamber 47 is supplied with oil through an oil hole c.

The cancel plate 45 of the fourth clutch C4 is provided with axial movement thereof constrained by a snap ring 30 formed on the boss portion 22c of the third clutch C3. An outer diameter side of the cancel plate 45 is engaged with the inner peripheral surface of the piston 44 of the fourth clutch C4 in an oil tight condition via a seal member 60. The cancel oil chamber 48 generates an oil pressure that balances the centrifugal oil pressure generated by the operating oil chamber 47 of the fourth clutch C4, and is structured by the inner peripheral surface of the piston 44 and an outer peripheral surface of the cancel plate 45. The cancel oil chamber 48 is supplied with lubrication oil by an oil hole d. The return spring 46 is provided between the cancel plate 45 and the piston 44, and constantly biases the piston 44 forward.

Next, the operation of the third clutch C3 and the fourth clutch C4 according to the second embodiment will be explained below.

The third clutch C3 moves the piston 24 in the axial direction by the oil pressure generated in the operating oil chamber 27, and pressing against the friction plate 21 engages and disengages the third clutch C3. The operating oil chamber 27 is supplied with operating oil based on an oil pressure generated by an oil pump (not shown) via the oil hole b formed in the clutch drum 22.

Centrifugal oil pressure acts on the operating oil chamber 27. Therefore, the cancel oil chamber 28, which sandwiches the piston 24 and faces the operating oil chamber 27, is directly supplied with lubrication oil from the oil hole a. Centrifugal oil pressure is consequently generated in the cancel oil chamber 28, and balances the centrifugal oil pressure generated in the operating oil chamber 27.

Similarly with the fourth clutch C4, the operating oil chamber 47 is supplied with operating oil from the oil hole c based on the oil pump (not shown). The fourth clutch C4 thus moves the piston 44 in the axial direction, and pressing against the friction plate 41 engages and disengages the fourth clutch C4. In addition, the cancel oil chamber 48 is supplied with lubrication oil from the oil hole d. Centrifugal oil pressure is consequently generated in the cancel oil chamber 48, and balances the centrifugal oil pressure generated in the operating oil chamber 47.

Thus upon disconnection of the third clutch C3, the pressure oil in the operating oil chamber 27 is drained via the oil hole b. However, due to the rotation of the clutch drum 22, centrifugal oil pressure is generated in the operating oil chamber 27. At such time, the back surface of the piston 24 is subjected to the energizing force of the return spring 26 and the centrifugal oil pressure acting on the oil in the cancel oil chamber 28. The piston 24 is thus rapidly moved in a retreating direction against the centrifugal oil pressure in the operating oil chamber 27.

There are cases where a force acts to bring the clutch drum 42 of the fourth clutch C4 closer to the clutch drum 22 of the third clutch C3, such as when the third and fourth clutches C3, C4 are disengaged at the same time and no axial force acts in a direction opposing the clutch drum 22 of the third clutch C3 and the clutch drum 42 of the fourth clutch C4, or when the piston 44 of the fourth clutch C4 performs a stroke in order to engage the fourth clutch C4. Regardless of whether such cases occur, an attachment load of the return spring 26 of the third clutch C3 (a load when the piston 24 is not operating and the return spring 26 is not compressed) is set larger than an operating load of the return spring 46 of the fourth clutch C4 (a load when the piston 44 is operating and the return spring 46 is compressed). Therefore, the energizing force of the return spring 26 directly acts on the clutch drum 42. As a consequence, both the clutch drums 22, 42 are constantly subjected to a force in a separating direction and positioned by the snap ring 50.

As explained above, according to the automatic transmission 1 of the present embodiment, the cancel plate structuring the cancel oil chamber 28 of the third clutch C3 is structured by the flange portion 42b of the clutch drum 42 of the fourth clutch C4. Thus, the cancel plate can be omitted so as to shorten an axial length of the automatic transmission 1.

According to a first aspect of the present invention, among two adjacent clutches, a cancel plate structuring a cancel oil chamber of one clutch among the two clutches and a piston of the other clutch among the two clutches are arranged so as to oppose an energizing force of a return spring of the two clutches. Also, the return spring of the one clutch among the two clutches has an energizing force that is stronger than that of the return spring of the other clutch among the two clutches. In addition, the cancel plate of the other clutch among the two clutches is disposed retained with respect to a clutch drum of the one clutch among the two clutches due to a holding member. Therefore, regardless of the condition, both of the clutches can be maintained in a predetermined state, while also reducing the number of holding members such as snap rings used to retain the cancel plate. Eliminating a holding member consequently enables shortening in an axial direction.

According to a second aspect of the present invention, the cancel plate of the one clutch among the two clutches and the clutch drum of the other clutch among the two clutches are retained with respect to an oil pressure acting direction of a cancel oil chamber by stepped portions. Therefore, the cancel oil chamber and a friction plate of the one clutch among the two clutches and a friction plate of the other clutch among the two clutches can be collectively disposed in a compact manner.

According to a third aspect of the present invention, the one clutch among the two clutches is arranged overlapping in an axial direction on an outer diameter side of the other clutch among the two clutches. Also, the cancel plate of the one clutch among the two clutches is fitted with the other clutch among the two clutches via both the stepped portions thereof and is disposed retained with respect to the oil pressure acting direction of the cancel oil chamber. The cancel plate of the other clutch among the two clutches is disposed on a boss portion of the one clutch among the two clutches and retained with respect to the oil pressure acting direction of the cancel oil chamber via a snap ring. Therefore, even in such cases where no centrifugal oil pressure is generated in the cancel oil chamber or where the clutch drum of the other clutch among the two clutches is subjected to a reaction force of an oil pressure during a piston stroke of the other clutch among the two clutches, the return spring of the one clutch among the two clutches maintains both the clutch drums biased toward a predetermined position set by the snap ring, and it is possible to constantly maintain an oil passage to a predetermined clearance formed from a clearance between both the clutches.

According to a fourth aspect of the present invention, the operating oil chamber and the cancel oil chamber of the one clutch among the two clutches as well as the operating oil chamber and the cancel oil chamber of the other clutch among the two clutches are arranged overlapping in a radial direction and parallel in the axial direction. Also, the cancel plate of the one clutch among the two clutches structures the clutch drum of the other clutch among the two clutches. Therefore, it is possible to eliminate the cancel plate of the one clutch among the two clutches, thereby shortening an axial length of the automatic transmission.

According to a fifth aspect of the present invention, the automatic transmission achieves eight forward speeds and at least one reverse speed and is compact, particularly in the axial direction.

What is claimed is:
1. An automatic transmission, comprising:
two adjacent clutches, wherein the two clutches each include:
a clutch drum,
a piston that structures an operating oil chamber with a portion of the clutch drum used as a cylinder,
a plurality of friction plates that engage with the clutch drum,
a cancel oil chamber that is arranged on a back surface side of the piston and that cancels a centrifugal oil pressure acting on the operating oil chamber, and
a return spring that is provided within the cancel oil chamber and that is structured between a cancel plate and a back surface of the piston and that biases the piston toward the operating oil chamber, wherein:

the cancel plate of one clutch among the two clutches and the piston of the other clutch among the two clutches are arranged so as to oppose an energizing force of the return spring of the two clutches, the cancel plate of the other clutch among the two clutches is disposed retained by a holding member with respect to the one clutch among the two clutches, the return spring of the one clutch among the two clutches has an energizing force that is stronger than that of the return spring of the other clutch among the two clutches, and the clutch drum of the other clutch among the two clutches is disposed retained with respect to an oil pressure acting direction of the cancel oil chamber of the one clutch among the two clutches with the energizing force of the return spring of the one clutch among the two clutches.

2. The automatic transmission according to claim 1, wherein:

the cancel plate of the one clutch among the two clutches comprises a stepped portion, the clutch drum of the other clutch among the two clutches comprises a stepped portion, wherein:

by engaging both of the stepped portions, the cancel plate of the one clutch among the two clutches and the clutch drum of the other clutch among the two clutches are disposed retained with respect to the oil pressure acting direction of the cancel oil chamber of the one clutch among the two clutches.

3. The automatic transmission according to claim 2, wherein:

the one clutch among the two clutches is arranged overlapping in an axial direction with an outer diameter side of the other clutch among the two clutches, the cancel plate of the one clutch among the two clutches is fitted with the clutch drum of the other clutch among the two clutches via both the stepped portions thereof and is disposed retained with respect to the oil pressure acting direction of the cancel oil chamber, and the cancel plate of the other clutch among the two clutches is disposed on a cylindrically formed boss portion on an inner diameter side of the clutch drum of the one clutch among the two clutches, and is retained with respect to the oil pressure acting direction of the cancel oil chamber via a snap ring.

4. The automatic transmission according to claim 1, wherein:

the operating oil chamber and the cancel oil chamber of the one clutch among the two clutches as well as the hydraulic servo and the cancel oil chamber of the other clutch among the two clutches are arranged overlapping in a radial direction and parallel in the axial direction, and the cancel plate of the one clutch among the two clutches structures the clutch drum of the other clutch among the two clutches.

5. The automatic transmission according to claim 1, further comprising:

an input shaft to which an input rotation from a driving source is input;

a reduction planetary gear that includes:
a first sun gear held stationary with respect to a case and a fixed member integrated with the case,
a first carrier connected with the input shaft, and
a first ring gear that outputs a rotation reduced in speed by the stationary first sun gear and the first carrier to which an input rotation has been input; and a planetary gear set that includes:
a second sun gear that inputs a decelerated rotation of the first ring gear through engagement of a first clutch,
a third sun gear that inputs the decelerated rotation of the first ring gear through engagement of a third clutch, inputs a rotation of the input shaft via the first carrier through engagement of a fourth clutch, and is held stationary through locking of a first brake, and
a second carrier that includes a long pinion meshed with the third sun gear and a short pinion meshed with the second sun gear, and is held stationary through locking of a second brake and inputs the rotation of the input shaft through engagement of a second clutch; and
a second ring gear that meshes with the long pinion and is rotatably connected with an output member, wherein:

the one clutch among the two clutches is the third clutch,
the other clutch among the two clutches is the fourth clutch,
a first forward speed is achieved by engaging the first clutch and locking the second brake,
a second forward speed is achieved by engaging the first clutch and locking the first brake,
a third forward speed is achieved by engaging the first clutch and the third clutch,
a fourth forward speed is achieved by engaging the first clutch and the fourth clutch,
a fifth forward speed is achieved by engaging the first clutch and the second clutch,
a sixth forward speed is achieved by engaging the second clutch and the fourth clutch,
a seventh forward speed is achieved by engaging the second clutch and the third clutch,
an eighth forward speed is achieved by engaging the second clutch and locking the first brake, and
a reverse speed is achieved by engaging one of the third clutch and the fourth clutch and locking the second brake.

6. The automatic transmission according to claim 1, wherein the holding member is a snap ring provided on a boss portion of the clutch drum of the one clutch among the two clutches.

7. The automatic transmission according to claim 1, wherein the energizing force of the return spring of the one clutch among the two clutches acts on the clutch drum of the other clutch among the two clutches via a stepped portion of the cancel plate of the one clutch among the two clutches and a stepped portion of the other clutch among the two clutches.

* * * * *